United States Patent Office 3,561,989
Patented Feb. 9, 1971

3,561,989
BLACK Fe-Cr OXIDE PIGMENT COMPOSITION
Horst Weber, Leverkusen, Germany, assignor to Farbenfabriken Bayer Aktiengesellschaft, Leverkusen, Germany, a corporation of Germany
No Drawing. Filed July 1, 1968, Ser. No. 741,258
Claims priority, application Germany, July 13, 1967,
F 52,944
Int. Cl. C09c 1/22; C01g 37/14;
U.S. Cl. 106—302                                       7 Claims

ABSTRACT OF THE DISCLOSURE

Black enamel and ceramic coloring substance in the form of a Fe-Cr oxide having corundum structure and a molar composition of about $$Fe_2O_3 \cdot (0.7-1.0)Cr_2O_3$$

and a process for the production thereof by annealing, e.g. at 1000 to 1300° C., a mixture of oxides and/or oxide-forming compounds, e.g. heat-decomposable hydroxides, acids, salts, etc., of iron, chromium, sodium and phosphorus, which mixture contains, per gram-atom of iron, the following constituents:

0.7 to 1.0 gram-atom of chromium
0.005 to 0.2 gram-atom of sodium
0.005 to 0.05 gram-atom of phosphorus and thereafter grinding, washing and drying the annealed material, e.g. to a particle size of about 0.1 to 60 μm., preferably 2 to 20 μm.

---

This invention relates to a process for the production of a black enamel and ceramic colouring substance of the iron-chromium oxide system, and more particularly to a process for the production of a black enamel and ceramic colouring substance with a molar composition of about $$Fe_2O_3 \cdot (0.7-1.0)Cr_2O_3$$

and to such Fe-Cr oxide substance per se.

For the black or grey colouring of enamels and ceramic glazes, it is preferred according to the present-day state of the art to use colouring substances which are composed of divalent and trivalent oxides of, for example, copper, cobalt, nickel, iron, chromium and manganese and have the crystal structure of spinel.

These spinel black colouring substances contain, as a divalent component, at least one of the expensive elements copper and cobalt, which prevents their wide application.

The spinel black colouring substances are closely related to the mineral "spinel" having a molar composition of about $MgO \cdot Al_2O_3$ with the difference however, that on part of the metal ions—usually the trivalent—have a octahedral configuration and the other part of the metal ions—usually the divalent—a tetrahedral configuration of the oxygen ions.

Consequently, efforts are always being made to find more economical black colouring substances. The very readily available black iron oxide which is, for example, widely used for the colouring of cement and which, as is known, also constitutes a spinel compound ($FeO \cdot Fe_2O_3$) is unfortunately not stable in enamels and glazes. Efforts to incorporate manganese or chromium oxide into the iron oxide base have certainly resulted in black products, but, because of insufficient stability or much too low a colouring power in the enamels and glazes, these have not proved successful as colouring substances.

A process for the production of a black enamel and ceramic colouring substance with a molar composition of about $$Fe_2O_3 \cdot (0.7-1.0)Cr_2O_3$$

has now been found, in which a mixture is prepared from oxides or oxide-forming compounds of iron, chromium, sodium and phosphorus, which mixture contains, per gram-atom of iron 0.7 to 1.0 gram-atom of chromium
0.005 to 0.2 gram-atom of sodium
0.005 to 0.05 gram-atom of phosphorus and in which this mixture is annealed at a temperature of from about 1000° C. to 1,300° C. and the annealed material is ground to a particle size of, for example, 0.1 to 60 μm. (micron) washed and dried.

The present process has made possible the production of a black colouring substance which contains only chromium and iron oxides and which shows substantially the same colouring power as the aforementioned best spinel black compounds, e.g. products which have a molar composition of about $CuO \cdot (Cr, Fe)_2O_3$; $CoO \cdot (Cr, Fe)_2O_3$ or $(Co, Ni)O \cdot (Cr, Fe, Mn)_2O_3$, and which has the same stability in enamels and glazes and is economical in manufacture and use.

With the process according to the invention, the colouring substance is formed as a solid solution of the trivalent oxides of iron and chromium in a good state of crystallinity and in an average size of the primary particles of from about 0.1 to 1 μm., which is suitable for the colour tone and the required colouring power, and the particles of which are aggolmerated into aggregates, which have a size of up to 60 μm. after grinding. The structure of the atoms in the crystal lattice has the same arrangement as that which is known from the corundum structure of $\alpha$-$Al_2O_3$ (corundum), $\alpha$-$Fe_2O_3$ (haematite) and $\alpha$-$Cr_2O_3$, and is distinguished from these one-substance systems only by a slight deviation of the lattice constants and the scattering intensity, for example, with X-ray powder exposure.

The difference with respect to the spinel compounds is, for example, easily to be seen from the results of the X-ray powder exposure, as will be shown by the following most important and more intensive $d$-values (i.e. diffraction values) of such an exposure made with Cr radiation (=2.2909 A.) $d$-values of the X-ray powder exposure in A. units:

| Corundum black—Fe-Cr oxide: | Spinel black—Cu-Cr-Fe oxide |
|---|---|
| 3.65 | 4.75 |
| 2.65 | 2.95 |
| 2.2 | 2.5 |
| 1.85 | 2.1 |
| 1.7 | 1.7 |
| 1.5 | 1.6 |
| 1.45 | 1.5 |
| 1.3 | 1.45 |
| 1.25 | 1.3 |

Both structures differ furthermore from each other as in the corundum-structure all metal ions are octahedrally surrounded by oxygen-ions whereas in the spinel-structure a part of the metal ions have the coordination number 4, i.e. the aforesaid tetrahedral configuration of the oxygen ions.

The product also differs in composition and structure from the chromic which is known as a mineral and which is known to constitute a compound of divalent iron and trivalent chromium in spinel structure.

For carrying out the process, it is for example possible to use the following raw materials: Oxides of iron, chromium, sodium and phosphorus and/or their compounds, e.g. heat-decomposable hydroxides, acids and salts of iron, chromium, sodium and phosphorus which supply oxide under the reaction conditions, as for example: iron hydroxides, iron sulphates, iron phosphates, iron chromates, chromium hydroxides, chromic acid, ammonium chromate, sodium chromates, chromium sulphate, chromium phosphates, sodium phosphates, phosphoric acid, sodium hydroxide, sodium carbonate, sodium nitrite, sodium nitrate and/or sodium chloride. The mixing can take place by the dry or wet method in conventional mixers or mills.

The annealing can be carried out in conventional muffle, hearth, tunnel, rotary or other furnaces. The furnace atmosphere is not very critical, so that, for example it is also possible to anneal in loose bulk form with direct gas heating, an oxidising flame being however chosen in order to avoid the deposition of soot.

The formation of the colouring substance occurs on annealing in the temperature range of from about 1000° C. to 1300° C. Within this range, it is possible to influence the particle size and the colour properties of the product. Thus, in the lower range of from about 1000° C. to 1150° C., very small primary particles are formed. This is made noticeable by a higher colouring power in a frit containing a white clouding substance such as e.g. oxides of zirconium and antimony or zirconium silicate and by a decreases in the depth of colour in unclouded systems. In the higher range from about 1150° C. to 1300° C., on the other hand, the primary particles are coarser, the depth of colour in unclouded frits is greater and colouring power in clouded frits is lower, so that it is advantageous to choose the higher temperatures of the indicated range for deep black colourings and the lower temperatures of this range for grey colourings. The colouring substance under consideration is also formed above and below the indicated temperatures. It only has the disadvantage that the products annealed below 1000° C. have too strong a red tinge and are sensitive in grinding. Above 1300° C., the primary particles are too coarse, the fragments of the annealed material are too hard for a normal grinding and the colouring power is too low.

The annealing time has less effect on the formation and qualities of the new pigments than the temperature. The mixtures are to be calcined at temperatures of below 1150° C. for at least 30 minutes; at higher temperatures the annealing should take at least 15 minutes. At lower temperatures, i.e. about 1100° C. an annealing time of several hours (4–6) is not harmful as far as agglomeration of the particles is concerned. At higher temperatures the duration of calcining should be kept shorter in order to avoid the formation of coarse particles, i.e. at 1300° C. 15 to 30 minutes should not be exceeded.

The sodium- and phosphoric compounds form sodium phosphate under the process conditions, thereby promoting reaction and crystallization of the iron- and chromium compounds. Without the addition of these mineralizing compounds the final pigment has a reddish colour and only a weak colouring power. Furthermore, the annealing- and grinding-stability is unsufficient.

The annealed material is preferably ground in conventional ball mills with the addition of water. The annealed aggregates the agglomerates of which have a particle size of more than 100 μm. are comminuted to about 1 to 60 μm. with an average of about 2 to 20 μm. The sodium phosphate and salts possibly introduced by contamination of the raw materials which are used are dissolved and removed by a subsequent washing. After washing, the product contains none of the starting sodium or phosphorus constituents and is dried.

Advantageous forms of the present process are described in the following examples:

EXAMPLE 1

300 g. (1.88 mols) of iron oxide ($Fe_2O_3$) containing 3.75 gram-atoms of iron and 250 g. (1.64 mols) of chromium oxide ($Cr_2O_3$) containing 3.28 gram-atoms of chromium are mixed with 15 g. (0.091 mol) of sodium phosphate ($Na_3PO_4$) containing 0.274 gram-atom of sodium and 0.091 gram-atom of phosphorus and 450 ml. of water in a ball mill. The mixture, which contains, per gram-atom of iron, about 0.875 gram-atom of chromium,
0.073 gram-atom of sodium and
0.024 gram-atom of phosphorus, is dried and annealed in an open ceramic crucible in a muffle furnace for one hour at 1250° C. 400 ml. of water are added to the annealed material, which is ground for 10 hours in a ball mill, washed by the alternate addition of washing water and filtration and then dried.

The average particle size of the primary particles according to B.E.T. (evaluated from the specific surface area) is 0.7 μm. More of 98% of the agglomerated particles have a size of less than 60 μm. according to sieve-analysis.

The product, which is obtained in a quantity of about 550 g., shows a molar composition of $Fe_2O_3 \cdot 0.875\ Cr_2O_3$, and the following most intensive d-values according to the Debeye-Scherrer method: 3.65; 2,65; 2.2; 1.85; 1.7; 1.5; 1.45; 1.3; 1.25 A. It is excellently suitable for the production of deep black enamellings and glazings.

The colouring power of the product is at least as strong as that of the spinels used heretofore for the same purpose. The annealing- and grinding-stability is excellent.

EXAMPLE 2

600 kg. of iron oxide ($Fe_2O_3$) and 500 kg. of chromium oxide ($Cr_2O_3$) are mixed with 30 kg. of sodium phosphate ($Na_3PO_4$) and 900 litres of water in a ball mill.

The mixture, which contains per gram-atom of iron, about 0.875 gram-atom of chromium
0.073 gram-atom of sodium and
0.024 gram-atom of phosphorus is dried and is annealed in a rotary furnace lined with ceramics and directly heated with gas for about 2 hours at 1150° C. 850 litres of water are added to the annealed material, which is ground for 10 hours in a ball mill, washed and dried.

The average particle size of the primary particle size according to B.E.T. (calculated from the specific surface area) is 0.4 μm. More of 98% of the agglomerated particles have a size of less than 60 μm. according to sieve-analysis.

The product, which is obtained in a quantity of about 1100 kg., shows a molar composition of about $Fe_2O_3 \cdot 0.875\ Cr_2O_3$ and a corundum structure, and is suitable in advantageous manner for the production of deep black enamellings and glazings, and in the presence of a clouding body, such as e.g. oxides of zirconium or antimony or zirconium silicates, also of gray enamellings and glazings.

The colouring power of the product is at least as strong as that of the spinels used heretofore for the same purpose. The annealing- and grinding-stability is excellent.

What is claimed is:

1. Black enamel and ceramic colouring substance with corundum structure and a molar composition of substantially about $$Fe_2O_3 \cdot (0.7-1.0)\ Cr_2O_3$$

wherein such substance has a particle size of about 0.1 to 60 μm. and possesses on X-ray powder exposure with Cr radiation (=2.2909 A.) the following intensive d-values in angstrom units: 3.65, 2.65, 2.2, 1.85, 1.7, 1.5, 1.45, 1.3, 1.25.

2. Process for the production of a black enamel and ceramic colouring substance according to claim 1 with corundum structure and a molar composition of substantially about $$Fe_2O_3 \cdot (0.7-1.0)\ Cr_2O_3$$

which comprises annealing at a temperature of from about 1000 to 1300° C. a mixture of compounds selected from the group consisting of oxides and oxide-forming compounds of iron, chromium, sodium and phosphorus, and mixtures of such oxides and oxide-forming compounds, which mixture contains, per gram-atom of iron, the following constituents:

0.7 to 1.0 gram-atom of chromium
0.005 to 0.2 gram-atom of sodium
0.005 to 0.05 gram-atom of phosphorus and grinding, washing and drying the resultant annealed material.

3. Process according to claim 2, wherein the annealing temperature is from about 1000 to 1150° C. and correspondingly smaller particles are formed.

4. Process according to claim 2, wherein the annealing temperature is from about 1150 to 1300° C. and correspondingly larger particles are formed.

5. Process according to claim 2, wherein the resultant annealed material is reduced by such grinding to a particle size between about 0.1 to 10 μm.

6. Process according to claim 2, wherein said mixture of compounds is selected from the group consisting of oxides and heat-decomposable hydroxides, acids and salts of iron, chromium, sodium and phosphorus.

7. Process according to claim 2, wherein said mixture of compounds is selected from the group consisting of iron oxides, iron hydroxides, iron sulfates, iron phosphates, iron chromates, chromium oxides, chromium hydroxides, chromic acid, ammonium chromate, sodium chromates, chromium sulfate, chromium phosphates, sodium oxides, sodium hydroxide, sodium carbonate, sodium nitrite, sodium nitrate, sodium chloride, sodium phosphates, phosphorus oxides, phosphoric acid, and mixtures thereof.

References Cited

UNITED STATES PATENTS

| | | | |
|---|---|---|---|
| 2,209,899 | 7/1940 | Darrin | 106—302 |
| 2,250,789 | 7/1941 | Ayers | 106—302X |
| 2,369,261 | 2/1945 | Slonim | 106—302 |
| 3,443,977 | 5/1969 | Bennetch | 106—302 |

OTHER REFERENCES

Muan et al., J. Amer. Ceramic Soc., vol. 43, p. 207 (1960).

Mellor, Comprehensive Treatise on Inorganic and Theoretical Chemistry, vol. 12, p. 529 (1932), vol. 13, pp. 922–23 (1934).

TOBIAS E. LEVOW, Primary Examiner

H. M. S. SNEED, Assistant Examiner

U.S. Cl. X.R.

23—56; 106—48, 304